J. O. NYGAARD.
PRESS STUD.
APPLICATION FILED SEPT. 18, 1915.

1,263,276.

Patented Apr. 16, 1918.

Inventor,
Johan Olsen Nygaard,
By
Atty.

UNITED STATES PATENT OFFICE.

JOHAN OLSEN NYGAARD, OF CHRISTIANIA, NORWAY.

PRESS-STUD.

1,263,276.   Specification of Letters Patent.   Patented Apr. 16, 1918.

Application filed September 18, 1915.   Serial No. 51,421.

*To all whom it may concern:*

Be it known that I, JOHAN OLSEN NYGAARD, a subject of the King of Norway, residing at Christiania, Norway, have invented certain new and useful Improvements in Press-Studs; and I do hereby declare the following to be a full, clear, and exact description of the invention, such as will enable others skilled in the art to which it appertains to make and used the same, reference being had to the accompanying drawings, and to letters or figures of reference marked thereon, which form a part of this specification.

This invention relates to improvements in press stud fasteners of the kind in which the stud member is yieldingly held in the receiving member by means of a spring in the latter engaging the shank of the stud. The object of the invention is to provide a press stud fastener that will not become separated when the two parts of the fastener are subjected to lateral stress; and the invention consists in so forming the pocket of the receiving member that the head of the stud cannot touch any part of the pocket except the edge thereof.

In the accompanying drawings—

In said drawing, 1 designates the lower or stud member, and 2 the upper or receiving member which is provided with a wire spring 3 having two or more bends as usually employed in press studs of this character.

Both the lower and upper members of the fasteners have a dished base portion, the base of the upper member having a central aperture 4 of sufficient diameter to permit the head 5 of the lower member to freely pass therethrough.

When the upper and lower portions are together, the wire 3 serves as a yielding connection, but it is not relied upon as a fastening or locking means for the two parts when they are subjected to lateral stress.

In known fasteners the sides of the stud engage the walls of the receiving member and when the members are subjected to a lateral stress, the inner wall of the receiving member forms a rigid abutment for the side of the stud and operates as a surface on which the stud will slide.

According to the present invention the edge of aperture 4 in the receiving member forms the only rigid abutment for the head 5.

Figure 1:
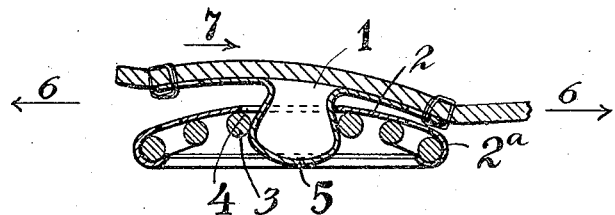
Figure 1 is a transverse vertical section of one form of fastener embodying my invention and illustrating the relative position of the two members when subjected to lateral stress.

In the construction shown in Fig. 1, the spring 3 is retained within the receiving member solely by means of the peripheral channel or groove $2^a$, and the shank of the stud may engage the edge of the aperture 4 at any point of its circumference.

Figure 2:
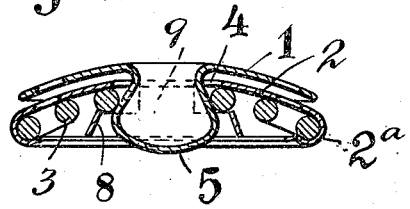
Fig. 2 is a transverse vertical section of a fastener showing a modified form of receiving member.
Figure 3:
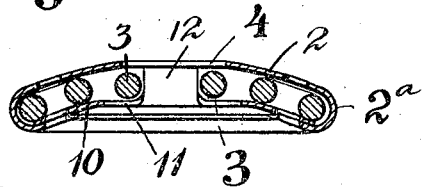
Fig. 3 is a transverse vertical section of another modified form of receiving member.
Figure 4:
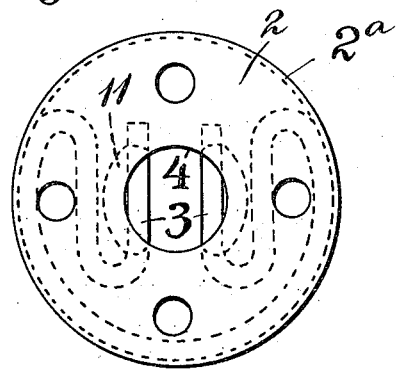
Fig. 4 is a plan view of Fig. 3.

A pocket or additional retaining means for the spring may be provided, as shown in Figs. 2 to 4.

In Fig. 2 the additional retaining means consists of an inwardly converging annular member 8 of larger diameter than the aperture 4. Said member is concentrically mounted within the receiving member and is secured thereto on opposite sides of the aperture 4 by means of ears 9 formed on the annular member.

When a lateral stress is exerted on the two parts of the fastener, the shank of the stud will engage the edge or periphery of the aperture 4 between the two ears 9 and owing to the size and form of the annular member, the head of the stud will not come into contact therewith and be raised thereby.

In Fig. 3 the spring retaining means consists of an annular dished plate 10 supported at its outer periphery in the groove $2^a$ and having a large central aperture 11. Ears 12 are formed on the plate on opposite sides of the aperture 11 and engage the inside of the base portion of the receiving member on opposite sides of the aperture 4. As pointed out in connection with Fig. 2, the shank of the stud can engage that portion of the periphery of the aperture 4 between the ears 12 without the head coming into contact with an interior wall.

The ears 9 and 12 form abutments for the inner ends of the spring 3 to limit their inward movement.

By dishing or curving the base portions of the members 1 and 2, too great an angle will not be formed between the base portions when said members are subjected to a lateral pull. The shank of the stud will not form a sliding surface for the edge of the aperture 4, as said edge will be situated in the angle formed by the side of the stud and the line of stress (indicated by the arrows 6—6) which line passes through the point of contact between the stud and the edge of the recess. As said line forms an acute angle with the side of the stud the two parts of the fastener cannot be moved axially until the lateral stress is overcome.

I claim—

1. A press stud fastener comprising two superimposed curved members, one of said members having a stud projecting through an aperture in the other member and normally out of contact with the latter, the edge of said aperture forming the only rigid abutment for the stud when said members are subjected to lateral stress, said edge coöperating with the stud to prevent axial displacement of the members.

2. A press stud fastener comprising two superimposed curved members, one of said members having a stud projecting through an aperture in the other member and normally out of contact with the latter, the sides of said stud forming an acute angle with said members, the edge of said aperture forming the only rigid abutment for the stud when said members are subjected to lateral stress, said edge coöperating with the stud to prevent axial displacement of the members.

3. A press stud fastener comprising two coöperating members having dished portions adapted to be superimposed, one of said members having a stud adapted to project through an aperture in the other member and normally out of contact therewith, the sides of said stud forming an acute angle with said dished portions, said dished portions operating, when subjected to lateral stress, to maintain the sides of the stud at an acute angle to said dished portions and prevent axial movement of said members.

4. A press stud fastener, comprising a stud member having a curved base, a receiving member having an aperture to receive the stud and a base portion to fit the base of the stud member, a peripheral channel formed in the receiving member, a spring mounted in said channel adapted to engage the stud, an annular member mounted in the receiving member out of the path of movement of the stud and adapted to support the spring, ears on the annular member extending between the ends of the spring, the edge of said aperture adapted to engage the stud and coöperating with the curved bases of said members when lateral stress is applied to the latter to prevent axial movement of the stud and receiving member.

5. In a snap fastener in which the stud member comprises a plate having a stud thereon of less diameter at its base than at its free end, and a socket member comprising a sheet metal case having a perforation, and a spring within the case having stud-contacting portions adjacent the edges of said perforation; the improvement which consists in having edge contact only between the narrowed portion of the stud and the edge of the sheet metal at the perforation of the socket member, and both the plate and the top of the socket member dished to interfit.

In testimony that I claim the foregoing as my invention, I have signed my name in presence of two subscribing witnesses.

JOHAN OLSEN NYGAARD.

Witnesses:
C. FABRICIUS HANSEN,
LUND WIEBERG.

Copies of this patent may be obtained for five cents each, by addressing the "Commissioner of Patents, Washington, D. C."